(12) United States Patent
Martin

(10) Patent No.: US 6,483,205 B1
(45) Date of Patent: Nov. 19, 2002

(54) DISTRIBUTED TRANSFORMER CONTROL

(76) Inventor: Ricky Martin, 1851 Pitcairn Dr., Costa Mesa, CA (US) 92626

( * ) Notice: Subject to any disclaimer, the term of this patent is extended or adjusted under 35 U.S.C. 154(b) by 123 days.

(21) Appl. No.: 09/627,367

(22) Filed: Jul. 28, 2000

(51) Int. Cl.$^7$ ................................................. H02J 1/00
(52) U.S. Cl. ............................................. 307/38; 307/83
(58) Field of Search ........................ 307/17, 29, 85–87, 307/112, 113, 125–127, 115, 38; 323/282, 346, 305, 300, 259; 363/22, 24, 71, 78

(56) References Cited

U.S. PATENT DOCUMENTS

| | | | | |
|---|---|---|---|---|
| 3,710,147 A | * | 1/1973 | Lee | 327/111 |
| 5,852,555 A | * | 12/1998 | Martin | 363/25 |
| 5,862,041 A | * | 1/1999 | Martin | 363/25 |
| 5,991,167 A | * | 11/1999 | Van Lerberghe | 363/127 |
| 6,064,580 A | * | 5/2000 | Watanabe et al. | 363/127 |
| 6,268,587 B1 | * | 7/2001 | Kooken et al. | 219/130.32 |

\* cited by examiner

*Primary Examiner*—Fritz Fleming
*Assistant Examiner*—Sharon Polk
(74) *Attorney, Agent, or Firm*—Curtis L. Harrington

(57) ABSTRACT

An improved circuit and device uses a set of eight switches, four of which are connected to the positive terminal, and four of which are connected to the negative terminal of a high voltage direct current power supply. The eight switches are attached in a distributed and overlapping manner to the inputs of up to six welding transformers. Pulse width modulation is utilized to distributively control power to the six welding transformers utilizing distributed control by a single controller. Phasing of the pulse width modulated power signal enables further optimization of the distributed control and is accomplished by a single controller and based upon feedback demand from the transformers utilizing typical measured parameters.

8 Claims, 4 Drawing Sheets

DISTRIBUTED TRANSFORMER CONTROL

FIELD OF THE INVENTION

This invention relates to a circuit and device for simultaneous control of multiple transformers and in which each transformer's power output can be individually controlled, and which is particularly useful for any transformer control but especially for welding transformers where high power control requirements normally militate toward costly independent controls.

BACKGROUND OF THE INVENTION

U.S. Pat. No. 5 862,041 and U.S. Pat. No. 5,852,555, both to the inventor of the present invention, describe dual inverter power supplies in which a series of switches are controlled by a pair of oscillators to control a pair of separately operable input:coils of a transformer. The general technique involved control of the two oscillators by a phase controller in order to vary the timing of the two oscillators to control a transformer output. This invention had as its goal the very close control of a transformer by utilizing eight switches, two oscillators and a phasing control to achieve exact control over a transformer.

One of the problems in general with respect to welding transformers is that once a good high voltage direct current power supply is available, limiting a particular welding appliance to use a single output transformer and especially its own control, can be cost prohibitive. In order that welding power distribution systems could be utilized more effectively, it would be advantageous for as much of the equipment downstream of the high voltage direct current supply to work in an interrelated way to provide several welding stations depending upon a single high voltage direct current supply. Put another way, for a single high voltage direct current supply, it would be advantageous to be able to provide control to a plurality of downstream transformers with due consideration to control parameters including even power distribution, control to prevent undue power consumption by one or more users, feedback control to enable power regulation in a manner as closely approximate to individual control as possible, and a form of control which can attempt to minimize power waste. If this control can be accomplished along with the elimination of physical elements of the equipment, such as individual controllers and the like, welding power supply units can be manufactured much more inexpensively to increase the opportunities for and cost barriers to providing more inexpensive welding processes and products.

The problems with earlier designs relating to transformers include switching loss, combined with the saturation loss and the current density. inefficiency. Earlier controls based upon duty cycle alone, or phasing alone have been unable to address the above problem of providing a distributed control. Most of the controls involving phasing can rapidly adapt to a new current or power output set point, but concentrated rather than distributed control is the main theme of the operating solution.

What is therefore needed is a circuit and device which enables high current at high frequency to be distributed and controlled with an interrelated control of such distribution so as to eliminate individual controllers and their accompanying cost. The needed method should include, for the utilization of a single equipment set for conversion of the standard AC to high voltage DC power source, for multiple controlled elements of equipment, such as welding transformers. Even more importantly, the needed circuit and device should provide itself with the capability for monitoring, and feedback to provide precise voltage, or current, or power to the fusing or welding electrodes.

SUMMARY OF THE INVENTION

An improved circuit and device uses a set of eight switches, four of which are connected to the positive terminal, and four of which are connected to the negative terminal of a high voltage direct current power supply. The eight switches are attached in a distributed and overlapping manner to the inputs of up to six welding transformers. Pulse width modulation is utilized to distributively control power to the six welding transformers. Each welding transformers two port input is dependent upon four of the switches at any given time to determine its duty cycle and power output. Each of the six welding transformers two port input is dependent upon a different four of the eight switches.

By reducing the pulse width of one switch, two of the transformers are affected. Of the two transformers affected, the total output of each transformer depends upon four total switches, three switches of which are associated not only with the transformer being affected, but also of three other transformers.

A controller which controls each wave form controls the pulse width of each switches square wave, affecting the length of the pulse width control wave form pulling in the outer edges toward the center to shorten the length of duration during which each switch is in its "on" position. Affecting the pulse width of one switch affects two transformers, but the other transformer can also be affected by three other switches.

The controller is programmed to provide precise control by computing the pulse width duration of each of the switches in order to provide the needed power and pulse duration to each of the switches in order to deliver the power protocol demanded. Power demanded may be by feed forward control, or interactive feedback may be provided. In terms of the mathematical relationship of controlling six transformers with eight switches, only two transformers can be absolutely independently controlled at the same time. However, by utilizing a heuristic protocol controller in which the power to the six transformers can be controlled within given limits, all six of the transformers can be controlled so long as their power consumption is not grossly different, one from another.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
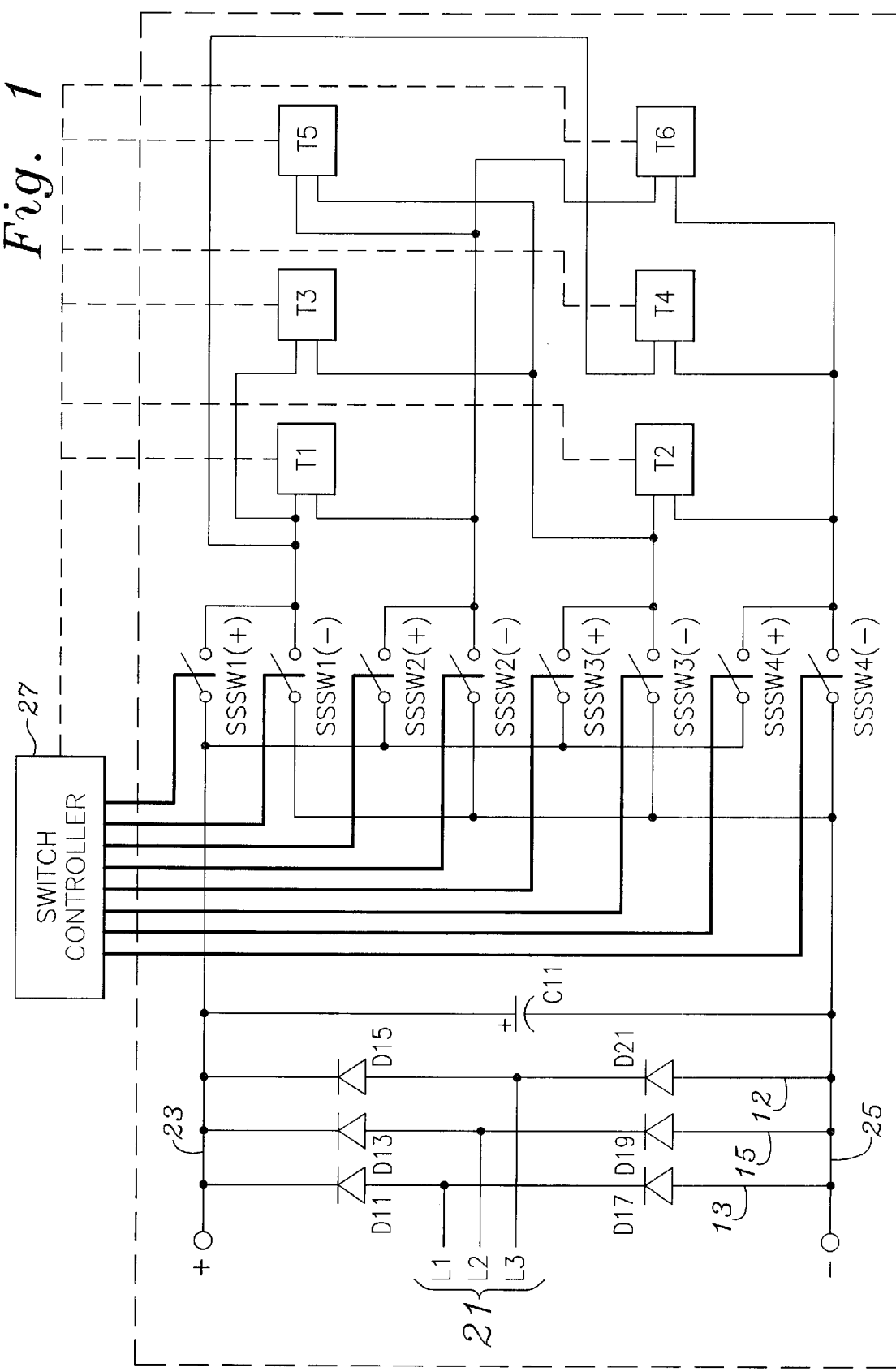
FIG. 1 is an overall schematic of the voltage and current bearing components of the circuit of the invention including direct current components, and an array of switches electrically connected to an array of six transformers, and which facilitates identification of the logic of control.

The description and operation of the invention will be best initiated with reference to FIG. 1. At the upper left side of FIG. 1, a three phase source supplies electricity through three lines L1, L2, & L3 to a three phase rectifier 21. The three phase rectifier 21 has a pair of direct current outputs, including a first line 23 and a second line 25. Between the direct current outputs and the lines 23 and 25 are pars of diodes including diodes D11 and D17 associated with line L1, diodes D13 and D19 associated with line L2, and diodes D15 and D21 associated with line L3. A filtering capacitor C11 is connected between first direct current line 23 and second direct current line 25 to short any alternating current components still present, and provide a low impedance to an instantaneous current demand.

A SWITCH CONTROLLER 27 has individual control lines connected to each of a set of eight switches labeled SSSW1(+), SSSW1(-), SSSW2(+), SSSW2(-), SSSW3(+), SSSW3(-), SSSW4(+), and SSSW4(-). The switches SSSW1(+), SSSW2(+), SSSW3(+), and SSSW4(+) are connected to the positive direct current line 23, while the switches SSSW1(-), SSSW2(-), SSSW3(-), and SSSW4(-) are connected to the negative direct current line 25. Each of the switches SSSW1(+), SSSW1(-), SSSW2(+), SSSW2(-), SSSW3(+), SSSW3(-), SSSW4(+), and SSSW4(-) are independently controlled by the SWITCH CONTROLLER 27. This independent control will enable the SWITCH CONTROLLER to further control individual components as will be shown.

To one side of the switches, the output terminals of SSSW1(+), SSSW1(-), SSSW2(+), SSSW2(-), SSSW3(+), SSSW3(-), SSSW4(+), and SSSW4(-) are connected to a series of transformers labeled T1, T2, T3, T4, T5, & T6. Normally, each pair of switches, for example SSSW1(+) and SSSW1(-) would normally connect to and operate a single transformer, for example, T1, in order to have completely independent control. However, as has been stated, independent control requires an independent controller and its associated cost. However, in the drawing of FIG. 1, the switches connecting the transformers T1, T2, T3, T4, T5, & T6, are distributed over the switches SSSW1(+), SSSW1(-), SSSW2(+), SSSW2(-), SSSW3(+), SSSW3(-), SSSW4(+), and SSSW4(-) in a manner such that control of one or more of the switches can control selected ones of the transformers.

As is seen, transformer T1 is controlled by SSSW1(+) and SSSW2(-). However, SSSW1(+) also is connected to transformers T1, T3 and T4. Any given transformer can be controlled using pulse width modulation by either limiting the duration of its switched on positive input or the duration of its switched on negative output. Both need not be absolutely controlled. Further, within a cycle, the phasing of the switching can be manipulated. Typically the phasing of pulse width modulation is performed around the center of the phase, that is by moving the length of the pulse width shorter by pulling it in about its center. A sophisticated SWITCH CONTROLLER 27 may not be so constrained.

Purely mathematically speaking, eight switches with independent controllers could operate four transformers. Using a single controller to operate eight switches which are interconnected with six transformers, in accord with the system shown in FIG. 2, can effect absolute independent control over only two transformers.

For example, to control transformer T1, switches SSSW1(+), SSSW1(-) and SSSW2(+), SSSW2(-) are required. These switches are also connected to transformers T3, & T4, and to transformers T5 & T6, respectively, which therefore cannot be independently controlled. At the same time, to control transformer T2, switches SSSW3(+), SSSW3(-), & SSSW4(+), and SSSW4(-) are required. These switches are also connected to transformers T3, T5 & T6 and T4 and T6, respectively, which cannot be independently controlled.

Independent control does not mean associated control. Independent control in this case is, for example, a 100% output to transformer T1, with a 1% output to transformer T2. Under this control scenario, power can be supplied to the other transformers, but some may be required to take 100% power, some may be required to take 1% power, with others having their power modulatably controllable between 100% and 1%. In the case just described, with SSSW1(+), SSSW1(-), and SSSW2(+); SSSW2(-) being operated in fully open or full pulse width modulation format, and with, SSSW3(+), SSSW3(-) and SSSW4(+), and SSSW4(-) operating at a 1% format, this case represents a nearly full take up of opposite conditions for the operation of the switches. As can be seen, transformer T3 faces a 100% duty on one terminal and a 1% duty on its other terminal and thus can only draw 1% power. The same is true for T5, T6 and T4.

Now, as an example of swing control, if transformer T1 is operating at 100% power, and instead of transformer T2, it was sought to operate transformer T3 at a 50% duty cycle, and noting that one input of transformer T3 is connected to SSSW1(+), SSSW1(-) which is already operating at a 100% duty cycle, this can be accomplished by limiting the operation of switches SSSW3(+), SSSW3(-) at a 50% duty cycle level. Thus, although one side of transformer T3 has a 100% duty cycle, the current through the transformer will flow based upon the limitation of the duty cycle of switches SSSW3(+), SSSW3(-).

Now, transformers which depend from switches SSSW3(+) & SSSW3(-), transformers T2, T3 and T5, will be limited to a 50% duty cycle. However, although these same transformers T2, T3 and T5, may be limited to a 50% duty cycle, other switch sets from which they depend, if not in conflict with other power duty cycles, can further limit output power. Continuing in the example given, transformer T2, which is also dependent upon switches SSSW4(+) & SSSW4(-), can have its duty cycle limited in accord with the duty cycle of SSSW4(+) & SSSW4(-). Transformer T5, which is also dependent upon switches SSSW2(+) & SSSW2(-), can also have it duty cycle limited in accord with the duty cycle of switches SSSW2(+) & SSSW2(-).

Assuming that the duty cycles for switches SSSW2(+) & SSSW2(-), and SSSW4(+) & SSSW4(-), is limited to 25%, to limit the duties of transformers T2 and T5, the remaining transformers T4 and T6 have a duty cycle based upon the other settings. Transformer T4 has one of its inputs at 100% and the second input at 25%, so it is limited to 25%. Transformer T6 has one of its inputs at 25% and the second input at 25%, so it is limited to 25%. As will be seen, some phasing can occur to further limit the power available. However a microprocessor controller can, even where limited to the simple logic and limitations above provide a near matching scheduling heuristic based upon demand. A dashed line format is seen to connect the switch controller to the transformers T1, T2, T3, T4, T5 and T6. These lines represent feedback which can range from feedback based upon transformer operation parameters including temperature, current demand, voltage, etc.

Now, any transformer T1, T2, T3, T4, T5 and T6 which has a duty less than 100% can have the phasing of its duty temporally shifted. If the shifting is deliberate, it can allow a cycle to be shared between another one of the transformers T1, T2, T3, T4, .T5 and T6 which might otherwise be eliminated from operation. The temporal shifting of the phase of the pulse width modulation can be used to further limit other transformers by operating such other transformer at a reduced (less than 100% duty cycle) but shifted with respect to other duty cycles in order to result in a duty cycle which is less than the duty cycles of the switches controlling the transformer of choice. This will be illustrated in the Figures following FIG. 2.

Figure 2:
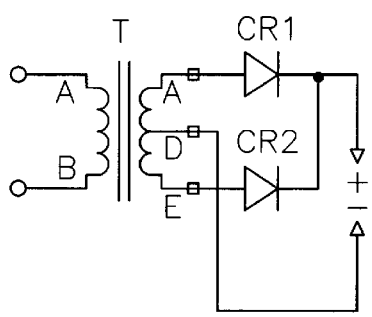
FIG. 2 is a circuit diagram as but one example for each of the array of six transformers seen in FIG. 1.

Referring to FIG. 2, a schematic view of a transformer circuit which can be utilized for the transformers T1, T2, T3, T4, T5 and T6 is shown. A primary winding includes terminals A and B, while a secondary winding includes legs A, D, & E. Legs A and E are connected into the inputs of diodes CR1 and CR2 which form the positive output for welding. Leg D forms the negative ground for the welding operation.

Figure 3:
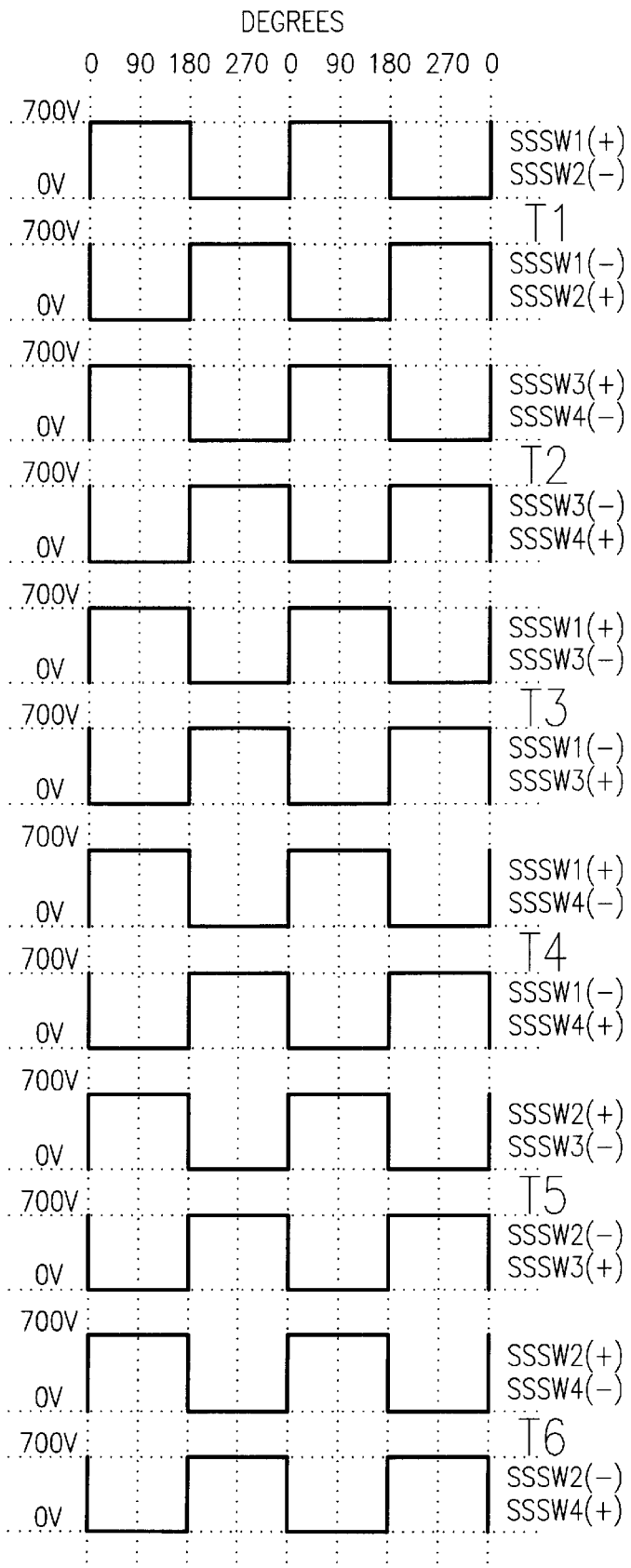
FIG. 3 is a phase diagram for all of the switches SSSW1 (+) through SSSW4(−) for controlling the six transformers of FIGS. 1 and 2 in a fully on, maximally energized condition.

FIG. 3 is a chart showing the state of the switches SSSW1(+), SSSW1(−), SSSW2(+), SSSW2(−), SSSW3(+), SSSW3(−), SSSW4(+), and SSSW4(−) as set for 100% operation to each respective one of the transformers T1, T2, T3, T4, T5 and T6. The temporal operation of one of the transformers T1, T2, T3, T4, T5 and T6 can exclude operations of certain ones of the other transformers T1, T2, T3, T4, T5 and T6, as will be seen.

Examples of transformer switch modulation will be illustrated. At the top, and to the right, transformer T1 is shown to be operated by switches SSSW1(+) and SSSW2(−). For the first 180° of the full 360° cycle, switch SSSW1(+) can be closed as is switch SSSW2(−), especially for a full power delivery setting. For the second, 180° of the full 360° cycle, switch SSSW1(+) and switch SSSW2(−) are opened while switch SSSW1(−) and SSSW2(+) are closed. This action keeps current flowing through Transformer T1.

Figure 4:
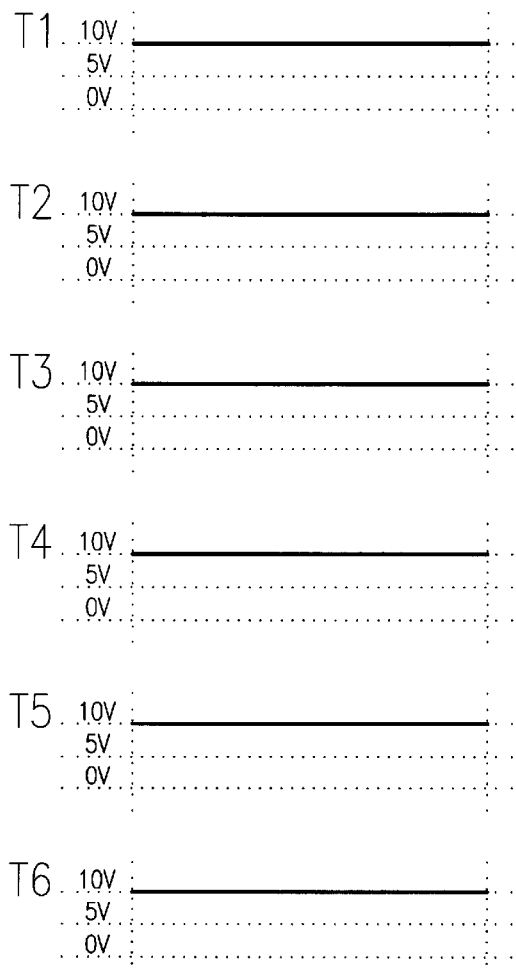
FIG. 4 is a chart illustrating power output associated with the phase diagram of FIG. 3.

FIG. 4 illustrates the voltage output for each of the transformers based upon the settings seen in FIG. 3, even though all transformers T1, T2, T3, T4, T5 and T6 cannot be fully 100% operated at the same time. Each of the transformers has full voltage, shown to be ten volts. Although FIG. 3 is couched in terms of a seven hundred volt magnitude and the output of FIG. 4 is couched in terms of a ten volt magnitude, the voltage inputs and outputs of choice can vary.

During control times where only one or two of the transformers T1, T2, T3, T4, T5 and T6 are to be operated, a reduction of duty cycle may occur about the midpoint of the wave forms. When this occurs, the half cycle is occupied. For example, considering the operation of transformer T1 by itself,. without regard to the operation of the other transformers, the first square shaped curve for SSSW1(+), over the first 180° of the full 360° will have the upper block wave form drawn inward toward the 90° mark from both the 0° and 180° ends. A 50% duty cycle will then include a square wave which, over the first 180° of the full 360° will begin at about 45° and terminate at the 135° mark. During the second 180° of the full 360° cycle, the second square shaped curve for SSSW1(−) over the second 180° of the full 360° would begin at about 225° and end at about 315°. For facilitating further discussion, we set SSSW2(−) and SSSW2(+) at a 100% duty cycle. Thus the duty cycle of the transformer T1 is limited by the duty cycles of only SSSW1(−) and SSSW1(+) at 50%. This is shown in FIG. 5.

Figure 5:
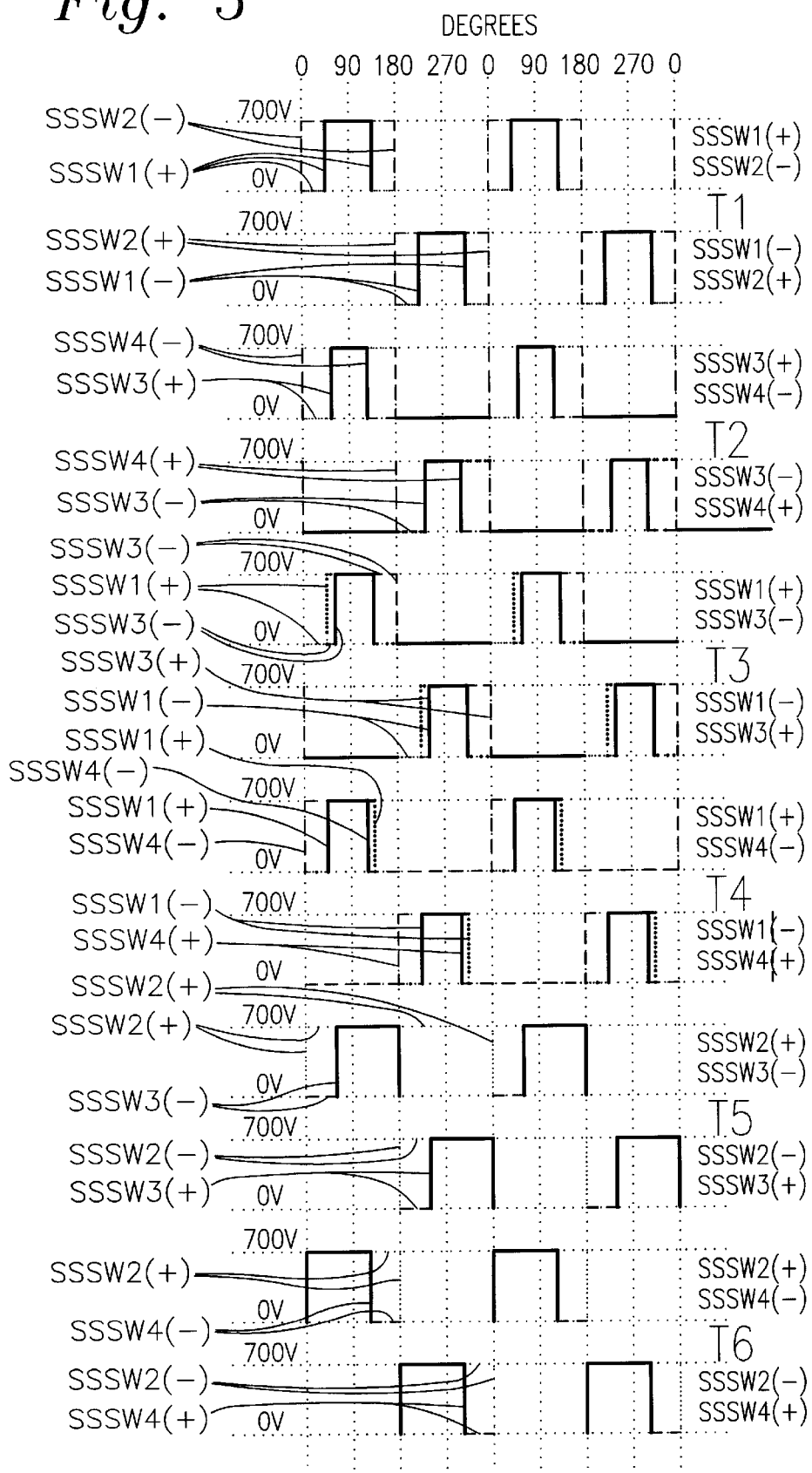
FIG. 5 is a phase diagram similar to that shown in FIG. 3 showing the pulse width modulation of SSSW1(+) & SSSW1(-) reduced from 180° to 90° (affecting transformers 1, 3 and 4 during the first 180° of the cycle) and the pulse width modulation of SSSW2(+) & SSSW2(-) remaining at a 100% duty cycle, and other switch settings as explained for analysis.

Referring to FIG. 5, note that switches SSSW1(+) & SSSW1(−) and SSSW2(+) & SSSW2(−) are phase centered the same, both about the mid point of the 180° cycle phase. However, switches SSSW1(+) & SSSW1(−) have a 50% duty cycle and stay on only from about 45° to about 135° in the cycle and switches SSSW2(+) & SSSW2(−) remain on for the full 180° half cycle. This centered relationship, even though with different duty cycles, however represents the simplest alternative for running different duty cycles for each set of switches to get a common (strictest) limiter for the transformer having associated with it the most severely limited duty cycle.

Referring again to FIG. 1, and assuming that half cycles are coordinated, it can be seen that if it were desired to operate transformers T1, T3 and T5, that during the first half cycle, with SSSW1(+) closed that SSSW2(−), SSSW3(−) & SSSW4(−) are required to be closed in order to accommodate current flow. This means that the transformers T2, T5, and T6 are inoperable during this half cycle. In the second half cycle a requirement of reversal of flow of current is such that the switch settings of the second half cycle involve a reversal of the setting of the switches in the first half cycle, namely that the closed switches are SSSW1(−) closed that SSSW2(+), SSSW3(+) & SSSW4(+).

Where the power output for any transformer will be less than half of its maximum, there is the possibility of cycle splitting with phasing, In cycle splitting, and where other switching problems are not an issue, such as switching time, transients, etc, more than 3 of transformers T1, T2, T3, T4, T5 and T6 may be also be operated using the interconnect configuration seen in FIG. 1.

With only a mention of cycle splitting generally, and referring again to the first wave form of FIG. 5, if instead of being centered about the 90° phase line, the 90° duration of on time of SSSW1(+) were to begin at 0° and end at 90°, the remaining half of the first half cycle could be used for distributing power to another transformer. Continuing to assume that SSSW2(−) is fully on for the second half of the first half cycle, the switch SSSW1(+) can now opened to allow switch SSSW1(−) to be closed to enable back current to flow through transformers T1 if switch SSSW2(+) is closed, or transformer T3 if switch SSSW3(+) is closed, or transformer T4 if switch SSSW4(+) is closed. Thus where at least one of the cycles are half or less, the operation of the transformers T1, T2, T3, T4, T5 and T6 can be even more distributed. Put another way, where the duty of a transformer is less than 100% there exists the possibility of distributing the complement of that duty elsewhere.

Each wave form set seen in FIG. 5 is a composite overlap of two of the switch sets shown, even though it is impossible to operate all at the same time in accord with the logic connection scheme of FIG. 1. It is possible for the logic of FIG. 1 to have less connectivity, i.e. where each common switch terminal connects to less than three transformers. The logic would then be less restrictive, but the degree to which distributed restrictive control can be achieved would be less. The following table illustrates the start and stop of each of the switches seen in FIG. 5, to facilitate a discussion of examples of power control which could be possible for each transformer, again not withstanding the logic of FIG. 1, in order simply to show a few grossly oversimplified examples of phasing and the effect that the limitation of only one of an output and an input of a transformer limits the operation of that transformer in order to show that distributed control is dependent partly upon the degree to which a switch is not commonly connected and partly upon differential phasing. The table is arranged in the order seen in FIG. 5.

TABLE 1

|  | Start | End |
|---|---|---|
| SSSW1(+) | 45° | 135° |
| SSSW2(−) | 0° | 180° |
| T1 |  |  |
| SSSW1(−) | 225° | 315° |
| SSSW2(+) | 180° | 360° |
| SSSW3(+) | 60° | 180° |
| SSSW4(−) | 0° | 120° |
| T2 |  |  |
| SSSW3(−) | 240° | 360° |
| SSSW4(+) | 180° | 300° |
| SSSW1(+) | 45° | 135° |
| SSSW3(−) | 60° | 180° |
| T3 |  |  |
| SSSW1(−) | 225° | 315° |
| SSSW3(+) | 240° | 360° |
| SSSW1(+) | 45° | 135° |
| SSSW4(−) | 0° | 120° |
| T4 |  |  |
| SSSW1(−) | 225° | 315° |
| SSSW4(+) | 180° | 300° |
| SSSW2(+) | 0° | 180° |
| SSSW3(−) | 60° | 180° |
| T5 |  |  |
| SSSW2(−) | 180° | 360° |
| SSSW3(+) | 240° | 360° |
| SSSW2(+) | 0° | 180° |
| SSSW4(−) | 0° | 120° |
| T6 |  |  |
| SSSW2(−) | 180° | 360° |
| SSSW4(+) | 180° | 300° |

The table and the phasing shown illustrate but some possibilities and such possibilities are illustrated without consideration of the fact that all of the transformers T1, T2, T3, T4, T5 and T6 cannot be on at the same time. Again, the degree of connectivity can be greater or less than that shown in FIG. 1.

Figure 6:
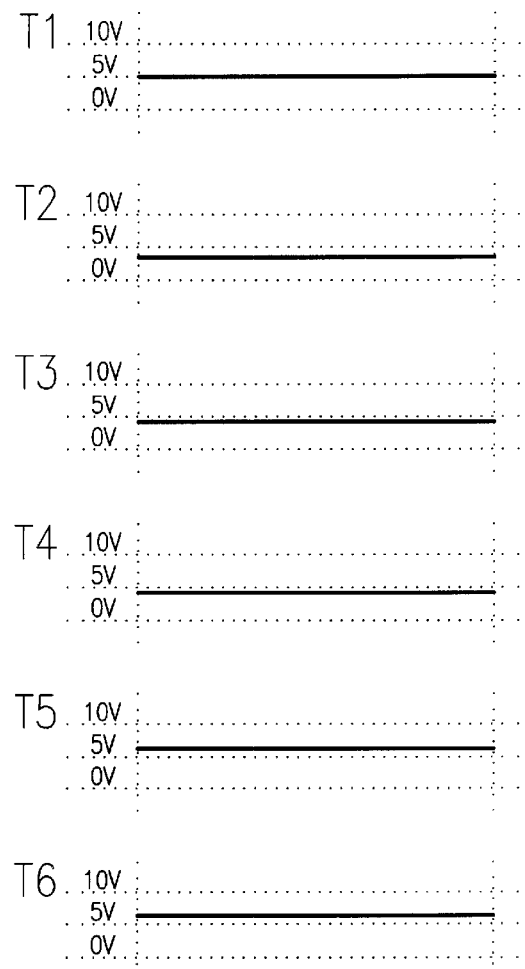
FIG. 6 is a chart illustrating power output associated with the phase diagram of FIG. 5.

The output results for each transformer, given an exemplary and unrelated series of input conditions, is seen in FIG. 6. Distributed control is first based upon not violating the logic for the interconnect configuration as seen in FIG. 1. Where duty cycles are low enough for cycle splitting, a further level of distribution is possible. Of course, cycle splitting and total cycle time may also be affected by the lumped parameter characteristics of the transformer elements like impedance and so on. As such, another possibility is to increase the total overall power of the system so that adequate power (including voltage, current, etc.) may be derived at lower duty cycles. If enough power is available for adequate power output even in the presence of cycle skipping, it can be seen that the independent control of three transformers at any time would equate to independent control of six transformers and complete control would be had for a defined maximum power level.

Thus, for more distributed control, both the logic of the switch operational possibilities and phasing must occur. For a gross example of phasing only, differential phasing, that is moving a given duty cycle to one side or the other of the 180° cycle, in order to get differential overlap with other switches' duty cycles. First, consider 10 a first 180° cycle of transformer T2 where switch SSSW3(+) is left off for the first 60° of the cycle and where SSSW4(−) is left off for the last 60° of the cycle, with only the middle 60° of the cycle existing where both are turned on (and again, the possibility that some or even all of the other transformers T1, T2, T3, T4, T5 and T6 may be dis-enabled by the operation of these two switches is ignored for the purpose of this example and others). The same is done with switches SSSW3(−) and SSSW4(+). The duty cycle is clearly ⅓. However, the position of switches SSSW4(−) and SSSW4(+), and especially the phasing for their on times as being 66% of the 180° half cycle make available a duty cycle of up to ⅓ for other transformers (if logically possible).

Referring to FIG. 5, and independent of the other considerations with reference from time to time to FIG. 1, transformer T2 is shown with its SSSW3(−)/SSSW3(+) duty cycle of ⅔ being out of phase with the settings of switches SSSW4(−)/SSSW4(+) which also have duty cycle of ⅔, but having a combined duty cycle of ⅓ due to having only a ⅓ overlap during its cycle, as discussed earlier. Other transformers are operable to the extent possible by not violating the logic of the interconnectivity.

In another separate example, if transformer T3 has a 50% centered duty cycle input from SSSW1(−)/SSSW1(+) (as was used in the earlier example) in combination with its ⅔ duty cycle input from SSSW3(−)/SSSW3(+) (but occurring at the rear two thirds of each of the 180° half cycles) the result gives an overlap which begins at 60° and ends at 135° to give an "on" period of 75° of 180° or 41.6% or an output of 4.16 volts out of ten volts.

In a separate and unrelated example, if transformer T4 has the temporally front loaded ⅔ duty cycle of switches SSSW4(−) and SSSW4(+), combined with a mid point centered 50% duty cycle of switches SSSW1(−) and SSSW1(+) to yield an overlap which begins at 45° and ends at 120° to give an "on" period of 75° of 180° or 41.6% or an output of 4.16 volts out of ten volts.

In a separate and unrelated example, if transformer T5 has a temporally delayed ⅔ duty cycle seen before in switches SSSW3(−) an d SSSW3(+), combined with the mid point centered 100% duty cycle of switches SSSW2(−) and SSSW2(+) to yield an overlap which begins at 60° and ends at 180° to give an "on" period of 120° of 180° or 66.6% or an output of 6.66 volts out of ten volts.

In a separate and unrelated example, if transformer T6 has the temporally front loaded ⅔ duty cycle of switches SSSW4(−) and SSSW4(+), combined with the mid point centered 100% duty cycle of switches SSSW2(−) and SSSW2(+) to yield an overlap which begins at 0° and ends at 120° to give an "on" period of 120° of 180° or 66.6% or an output of 6.66 volts out of ten volts. Thus it can be seen that phasing of the pulse width power modulating inputs can result in a wider variety of voltage outputs for the transformers. Where the equipment permits it, the phasing could occur at different points within the 180° cycle.

A good, smart, switch controller can take account of the demands on each of the six transformers T1, T2, T3, T4, T5 and T6 and quickly adjust switch duty cycles and phasing in order satisfy not all independent conditions as would be served by six separate controllers, but a much wider array of conditions than would otherwise be served by a single controller. This is especially realizable where the system is designed such that full power required by any given transformer is less than half and preferably a smaller fraction than the maximum energy which could be delivered. Stated differently, so long as the system is designed so that no transformer needs more than a small amount of energy represented by a pulse width less than half of the maximum pulse width applied, the power in the system described above can adequately serve more than the number of transformers which would logically otherwise be eliminated from service were the transformers required to be energized all at the same time within their cycles.

While the present invention has been described in terms of a circuit to be used in controlling welding transformers and any other pulse width adjusted or modulated aspects and the like, one skilled in the art will realize that the structure and techniques of the present invention can be applied to many similar devices. The present invention may be applied in any situation where a phase control or power averaging is to be used electrically to achieve desired electrical or electronic output.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A control utilizing distributed pulse width signal application comprising:

a first plurality of switches each having first terminal connected to a first power output and a second terminal;

a second plurality of switches each having a first terminal connected to a second power output and a second terminal;

a switch controller for operating said first plurality and said second plurality of switches;

a plurality of controlled components each having a first input connected to said second terminals of at least one of said first and said second plurality of switches and to at least said first input of at least another one of said plurality of controlled components and a second input connected to at least one of a first other of said second terminals of at least one of said first and said second plurality of switches and to at least said second input of at least one of a second other of said plurality of controlled components whereby the closure of at least one of each of said first and said second plurality of switches produces distributed output to at least two of said plurality of controlled components.

2. The control as recited in claim 1, wherein said distributed pulse width signal is a power signal.

3. The control as recited in claim 1, wherein said plurality of controlled components includes at least one transformer.

4. The control as recited in claim 1, wherein said plurality of controlled components each have said first input connected also to said at least said first input of at least a third other one of said plurality of controlled components and wherein said plurality of controlled components each have said second input connected also to said at least second input of at least a fourth other one of said plurality of controlled components.

5. The control as recited in claim 1, wherein said switch controller is configured to control the relative phasing of operation of said first plurality and said second plurality of switches to provide greater variation of said distributed output.

6. The control as recited in claim 1, wherein said switch. controller is configured to subdivide a cycle of operation to split operation between at least two of said first plurality and at least two of said second plurality of switches to provide greater variation of said distributed output.

7. The control as recited in claim 6, wherein said at least two of said first plurality and said at least two of said second plurality of switches are logically prevented from operating at the same time.

8. The control as recited in claim 1, wherein a maximum power of said first and said second power outputs exceeds a maximum power required by each of said plurality of controlled components by a factor of at least two.

* * * * *